United States Patent
Bulut

(10) Patent No.: US 12,246,273 B2
(45) Date of Patent: Mar. 11, 2025

(54) FILTERING SYSTEM

(71) Applicant: Recep Bulut, Ankara (TR)

(72) Inventor: Recep Bulut, Ankara (TR)

(*) Notice: Subject to any disclaimer, the term of this patent is extended or adjusted under 35 U.S.C. 154(b) by 189 days.

(21) Appl. No.: 17/620,289

(22) PCT Filed: Mar. 10, 2020

(86) PCT No.: PCT/TR2020/050191
§ 371 (c)(1),
(2) Date: Dec. 17, 2021

(87) PCT Pub. No.: WO2021/150179
PCT Pub. Date: Jul. 29, 2021

(65) Prior Publication Data
US 2022/0249988 A1    Aug. 11, 2022

(30) Foreign Application Priority Data
Jan. 23, 2020   (TR) ................... 2020/01014

(51) Int. Cl.
*B01D 29/90*   (2006.01)
*B01D 29/11*   (2006.01)
(Continued)

(52) U.S. Cl.
CPC .......... *B01D 29/908* (2013.01); *B01D 29/117* (2013.01); *B01D 29/606* (2013.01);
(Continued)

(58) Field of Classification Search
CPC .. B01D 29/908; B01D 29/117; B01D 29/606; B01D 29/668; B01D 29/90; B01D 29/11;
(Continued)

(56) References Cited

U.S. PATENT DOCUMENTS

2020/0269163 A1*   8/2020   Jackson ............. B01D 24/4631

FOREIGN PATENT DOCUMENTS

CN   201295554 Y   8/2009
CN   203139794 U   8/2013
(Continued)

OTHER PUBLICATIONS

CN 103949095 A English description, Jul. 30, 2014, Wang Gang et al.*

(Continued)

*Primary Examiner* — Akash K Varma
(74) *Attorney, Agent, or Firm* — Egbert, McDaniel & Swartz, PLLC

(57) ABSTRACT

Disclosed is a filtering system used in any pool filtrations, filtration of taps or building entrance hot and cold use water, filtration of city water before osmosis filtering devices, filtration of heating and cooling mechanical plant systems, and filtration of cooling water in hydro-electric power plants. The system provides for forming a vortex inside a filter by directing and increasing speed of filtered liquid and thus providing decreasing pressure on the filter surface and collection of filtered particulates in a particulate accumulation chamber. The system also provides for automatic cleaning of the filter by reverse flushing, without the need for dismantling, by differential pressure sensors based on rate of contamination.

1 Claim, 1 Drawing Sheet

(51) Int. Cl.
*B01D 29/60* (2006.01)
*B01D 29/66* (2006.01)
*B01D 35/30* (2006.01)
*B01D 36/00* (2006.01)

(52) U.S. Cl.
CPC ......... *B01D 29/668* (2013.01); *B01D 35/306* (2013.01); *B01D 36/001* (2013.01); *B01D 2201/0438* (2013.01); *B01D 2201/287* (2013.01); *B01D 2201/325* (2013.01)

(58) Field of Classification Search
CPC ...... B01D 29/60; B01D 29/66; B01D 35/306; B01D 35/30; B01D 36/001; B01D 36/04; B01D 36/00; B01D 2201/0438; B01D 2201/287; B01D 2201/325; B01D 24/10; B01D 24/4631; B01D 24/4884; B01D 24/40; B01D 24/46; B01D 24/12; B01D 24/48; C02F 1/004; C02F 1/00; C02F 2103/023; C02F 2103/42; C02F 2201/005; C02F 2209/03; Y02A 20/152

USPC ........................................................ 210/108
See application file for complete search history.

(56) References Cited

FOREIGN PATENT DOCUMENTS

| CN | 103949095 A | * | 7/2014 | ............. B01D 24/12 |
| KR | 20190052350 A | * | 5/2019 | ............. B01D 24/46 |

OTHER PUBLICATIONS

KR 20190052350 A English description, May 16, 2019, Yun Seong Gu.*
International Search Report for corresponding PCT/TR2020/050191, dated May 17, 2021.
Written Opinion of the International Searching Authority for corresponding PCT/TR2020/050191, dated May 17, 2021.

* cited by examiner

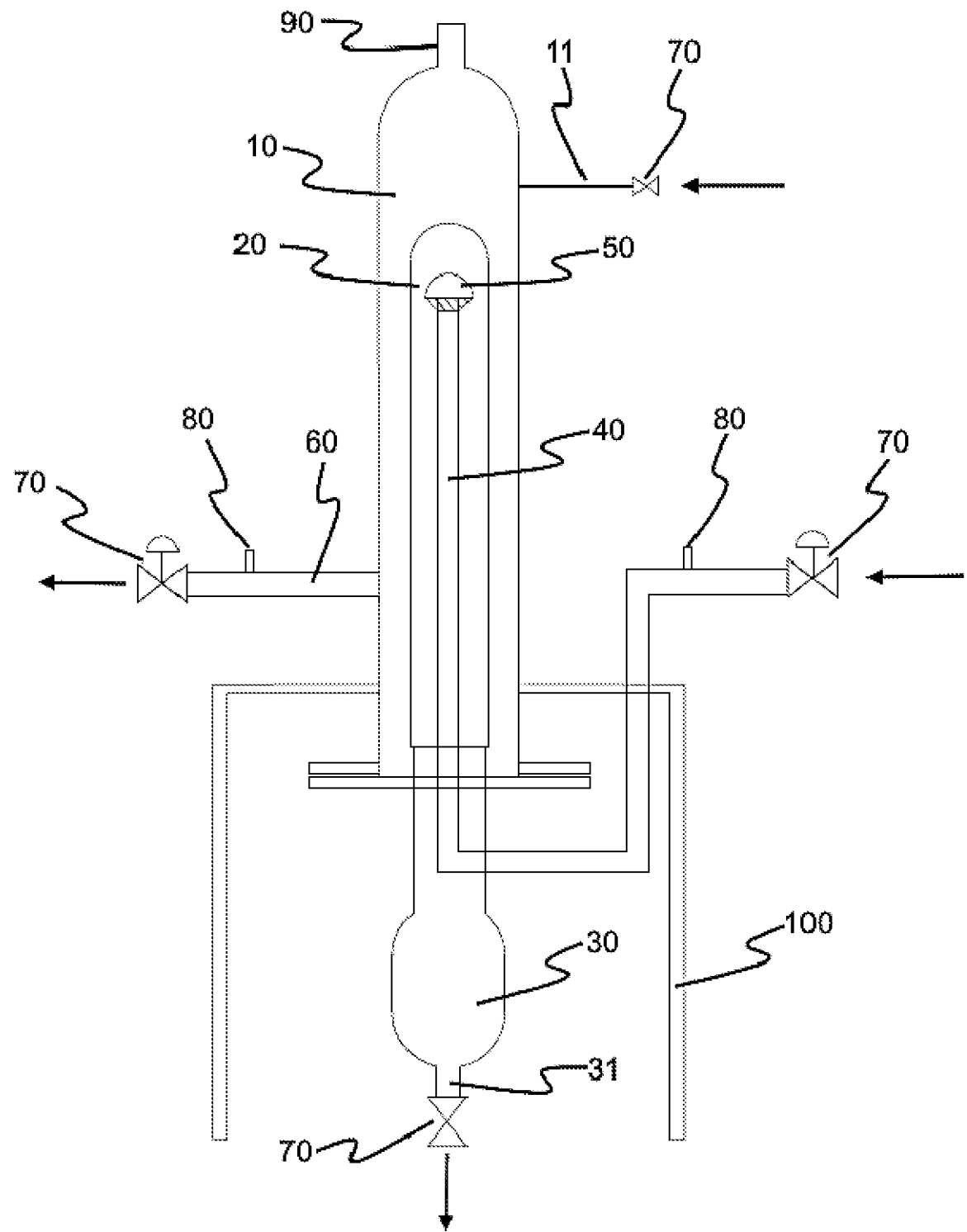

FILTERING SYSTEM

TECHNICAL FIELD

Invention relates to a filtering system used in any pool filtrations, filtration of taps or building entrance hot and cold use water, filtration of city water before osmosis filtering devices, filtration of heating and cooling mechanical plant systems, filtration of cooling water in hydro-electric power plants.

The invention particularly relates to a filtering system forming vortex inside filter by directing and increasing speed of filtered liquid and thus providing decreasing pressure on filter surface and collection of filtered particulates in a chamber and also cleaning of filter by reverse flushing without need for dismantle thereof.

PRESENT STATE OF THE ART

In the related art, various filtering systems are used for removal of particulates in the water in swimming and any other pools, pre-filtering operation of water from main source, city water, mechanical installation systems, hydro-electric power plants.

Sand filters are used in pool filtration field. Water of pool is pumped into sand filters by means of circulation pump and after particulates forming in water are filtered, it is given to pool again. However, sand filters can filter water at limited speeds. Sand filters are unable to retain particulates smaller than 20 microns. Also, sand filters contain various materials. They are sand, pine and various materials. Reverse flushing is made by means of giving water from bottom to the filter in order to remove particulates accumulating on polluted filters. Reverse flushing requires excessive amount of water consumption to clean filters.

Filtering is conducted at tap or building inlet for hot and cold use water from main source. Cartridge filters and dirt trappers are used for the filtering operation. The cartridge filters used therein are usually single use ones. Filters where reverse flushing is made do not allow very sensitive filtering. Also operating cost of such filters is too high.

Reverse osmosis filter devices are used to remove potential chemical, physical and microbiological pollutants in city water. Reverse osmosis devices pump water at high pressure and make it penetrate through semi-transparent film and thus provide cleaning of water. Cartridges used in reverse osmosis devices are very expensive and single use ones and therefore, operating costs are too high.

Heating and cooling mechanical installation systems produce particulate automatically during use. Dirt retainers and sediment trappers used in the heating and cooling mechanical installation systems retain particulates of big sizes. Particulates of micron size circulate independently in systems. Therefore, such particulates settle in the parts of system where circulating fluid slows down and reduces efficiency of the system and in time blocks the system. They also damage heat switchers and pumps used in the system by wearing them. They also cause blocking in working accessories of the system. Adaptation of bag filters applied in the heating and cooling mechanical installation systems has some disadvantages. One of the disadvantages is the accumulation of filtered particulates in the filter. Therefore, filter may get blocked too early. Another disadvantage is the need of dismantle of filter for cleaning. Since the dismantling operation requires continuation, it creates a big issue. Because automatic air discharge device is not applied in the system, it causes air accumulation in filtering container. Pressure loss in close systems cause a big issue too. For that reason, filter can not be installed directly to system to retain particulates of micron level.

Hydraulic filters commonly used in hydro-electric power plants aim to retain particulates remaining on filter surface by means of flushing system screening filter surface. The hydraulic filters cannot clean particulates sticking onto filter surface such as leaf, paper and bags and system stops. Dismantling and cleaning of the filters also cause high labour cost and time loss.

As a result, the because of existence the said problems mentioned above and inadequacy of solutions, it has been necessary to make a development in the related art.

PURPOSE OF THE INVENTION

This present invention relates to a filtering system eliminating above mentioned disadvantages and providing new advantages in the related art.

Primary purpose of the invention is to provide forming vortex inside filter by directing and increasing speed of filtered liquid and thus providing decreasing pressure on filter surface and collection of filtered particulates in a chamber and also cleaning of filter by reverse flushing without need for dismantle thereof.

Primary purpose of the invention is to provide long time use of filter without cleaning by means of forming vortex inside filter and accumulation of filtered particulates inside a chamber.

A further purpose of the invention is to provide automatic flushing of the filter by reverse flushing without need for dismantling and consuming too little water when filter reaches a certain rate of contamination.

Another purpose of the invention is to provide automatic discharge of air occurring in the filter by means of air discharge deice.

A further purpose of the invention is to reduce operation labour in cleaning of particulates in the water.

In order to achieve purposes described above and given under detailed description, the invention relates to a filtering system used in any pool filtrations, filtration of taps or building entrance hot and cold use water, filtration of city water before osmosis filtering devices, filtration of heating and cooling mechanical plant systems, filtration of cooling water in hydro-electric power plants and characterized by comprising

- filter chamber located in vertical position,
- a filter located in filter chamber center and providing filtration of particulates,
- particulate collection chamber located under filter and providing accumulation of filtered particulates,
- inlet line located vertically to filter centre in order to provide inlet of water to be filtered to flow to filter chamber in a manner from top to downward,
- vortex cap located on end inlet line having water outlet and providing downward flow of water entering system from inlet line inside the filter,
- outlet line associated to filter chamber and providing discharge of filtered water filled into filter chamber after passing through filter and leaving system.

The structural and characteristic features and all advantages of the invention will be understood better in the FIGURES given below and the detailed description by reference to the FIGURES. Therefore, the assessment should be made based on the figures and taking into account the detailed descriptions.

BRIEF DESCRIPTION OF THE DRAWINGS

FIG. 1 is illustrative view of filtering system of the invention.

DESCRIPTION OF PART REFERENCES

10. Filter chamber
11. Flushing water inlet
20. Filter
30. Particulate accumulation chamber
31. Flushing water outlet
40. Inlet line
50. Vortex cap
60. Outlet line
70. Engine valve
80. Differential pressure sensor
90. Automatic air discharge device
100. Foot

DETAILED DESCRIPTION OF THE INVENTION

In this detailed description, the preferred alternatives of filtering system being subject of the invention have been described in a manner not forming any restrictive effect and only for purpose of better understanding of the matter.

FIG. 1 shows illustrative view of filtering system of the invention. Accordingly, in the most basic form, the filtering system comprises filter chamber (10) located in vertical position on a foot (100), a filter (20) located in filter chamber (10) center and providing filtration of particulates, particulate accumulation chamber (30) located under the filter (20) and providing accumulation of filtered particulates, an inlet line (40) vertically located in filter (20) center in order to provide entrance of water to be filtered into the system, vortex cap (50) located on end of water outlet of inlet line (40), an outlet line (60) associated to filter chamber (10) and providing discharge of filtered water from the system, an engine valve (70) located on water inlet line (40) and outlet line (60) at flushing water outlet (31) at lower end of particulate accumulation chamber (30) at flushing water inlet (11) on the filter chamber (10) in order to provide control of inlet-outlet of water to be filtered in the system and flushing water, a differential pressure sensor (80) connected onto inlet line (40) and outlet line (60) and measuring pressure in the system and turning on/off the engine valves (70), an automatic air discharge device (90) connected to filter chamber (10) and discharging the air inside the filter chamber (10).

Filter chamber (10) forming main embodiment of the filtering system is located on a foot (100) in vertical axis. Filter chamber (10) has flushing water inlet (11).

Filer chamber (10) centre has a filter (20) providing filtration of particulates.

A particulate accumulation chamber (30) providing accumulation of filtered particulates and having a flush water outlet (31) at the lower and is located under the filter (20). The flush water outlet (31) provides exit from particulate accumulation chamber (30), of water entering through flush water inlet (11) on the filter chamber (10) in order to provide reverse flush of particulate accumulation chamber (30).

Inlet line (40) providing inlet of water to be filtered in the use area of filtering system, is located vertical position to filter (20) centre. Vortex cap (50) is provided on the end provided inside filter (20) of inlet line (40) providing entrance of water to be filtered into the system. Vortex cap (50) provides flow of water from inlet line (40) downward inside the filter (20).

Outlet line (60) is connected to filter chamber (10) in order to provide exit of filtered water from system through filter (20).

Engine valve (70) is connected to flushing water inlet (11) on filter chamber (10) and flush water outlet (31) on lower end of particulate accumulation chamber (30) to provide control of inlet-outlet of flush water in the system and also onto water inlet line (40) and outlet line (60) to provide control of inlet and outlet of water to be filtered in the system.

Differential pressure sensor (80) is connected to measure pressure of system onto inlet line (40) and outlet line (60) to provide turning on/off of engine valves (70) in order to provide flushing of filter (20) and particulate accumulation chamber (30) by reverse flushing and provide display of pollution rate of the filter (20).

Filter chamber (10) is connected to automatic air discharge device (90) providing discharge of air therein.

Working principle of filtering system of the invention is as follow;

Engine valve (70) connected to water inlet line (40) and outlet line (60) is in open position during water flowing in the filtering system. Water entering through inlet line (40) hits the vortex cap (50) on end of water inlet line (40) and flows downward inside the filter (20). During downward flowing of the water inside filter (20), vortex occurs inside filter (20) depending on flow rate of water and filling of water into filter chamber (10) from down to upwards is provided by means of providing flow of water through filter (20) by reducing pressure on filter (20) surface.

The particulates remaining inside the filter (20) during filling of water into filter chamber (10) after passing through filter (20) moves towards particulate accumulation chamber (30) and accumulate in the particulate accumulation chamber (30). Filtered water exits through exit line (60) connected to filter chamber (10).

After use of filtering system for a fixed time period, pressure in the system is measured by differential pressure sensors (80) on inlet line (40) and outlet line (60) as per pollution of filter (20). When pollution level of the filter (20) reaches a fixed level, differential pressure sensors (80) shut down the engine valves (70) connected to inlet line (40) and outlet line (60). Then they open engine valves (70) located on flush water inlet (11) and flush water outlet (31). Reverse flushing is performed by water entering through flush water inlet (11) and exiting from flush water outlet (31) on lower end of particulate accumulation chamber (30). Flush water is discharged from flush water outlet (31) together with the particulates in the particulate accumulation chamber (30) and thus filtering system is cleaned.

Air forming in the system during cleaning operation is discharged through automatic air discharge device (90).

The invention claimed is:

1. A filtering system comprising:
   a filter chamber having a vertical orientation;
   a filter positioned in a diametric center of said filter chamber, said filter adapted to filter particulates;
   a particulate accumulation chamber positioned below said filter, said particulate accumulation chamber adapted to accumulate the particulates filtered by said filter;
   an inlet line extending vertically in said filter chamber and extending along the diametric center of said filter chamber, said inlet line adapted to flow water to be filtered toward said filter;

a vortex cap positioned at an upper end of said inlet line, said vortex cap having a water outlet, wherein said inlet line is adapted to form a vortex by causing water to hit said vortex cap such that the water enters the filtering system at a center of said filter, the water flowing from upwardly within said filter and passing through said filter and filling said filter chamber from downwardly to upwardly;

an outlet line connected to said filter chamber and adapted to allow filtered water to be discharged from said filter chamber after the water to be filtered passes through said filter;

a first valve connected to said inlet line and to said outlet line, said first valve adapted to control a flow of the water to be filtered into said filter chamber through said inlet line and to control a flow of the filtered water from said filter chamber through said outlet line;

a flushing water inlet connected to said filter chamber;

a flushing water outlet positioned at a lower end of said particulate accumulation chamber;

a second valve connected to said flushing water inlet and to said flushing water outlet, said second valve adapted to control a flow of a flushing water from said filter chamber and to control the flow of the flushing water to said particulate accumulation chamber;

a differential pressure sensor positioned on said inlet line and on said outlet line, said differential pressure sensor controlling said first valve and said second valve relative to a pressure sensed by said differential pressure sensor;

an automatic air discharge device connected to said filter chamber and adapted to discharge air from within said filter chamber; and a foot positioned below said filter chamber, said foot supporting said filter chamber in the vertical orientation.

* * * * *